(12) United States Patent
Williams et al.

(10) Patent No.: US 8,713,371 B2
(45) Date of Patent: Apr. 29, 2014

(54) CONTROLLING GENERATION OF DEBUG EXCEPTIONS

(75) Inventors: Michael John Williams, Ely (GB); Richard Roy Grisenthwaite, Nr Royston (GB)

(73) Assignee: ARM Limited, Cambridge (GB)

( * ) Notice: Subject to any disclaimer, the term of this patent is extended or adjusted under 35 U.S.C. 154(b) by 295 days.

(21) Appl. No.: 13/296,445

(22) Filed: Nov. 15, 2011

(65) Prior Publication Data

US 2012/0198278 A1 Aug. 2, 2012

(30) Foreign Application Priority Data

Jan. 28, 2011 (GB) .................................. 1101490.9

(51) Int. Cl.
*G06F 11/00* (2006.01)
(52) U.S. Cl.
USPC .............................................. 714/30; 712/227
(58) Field of Classification Search
USPC .......................................................... 714/30
See application file for complete search history.

(56) References Cited

U.S. PATENT DOCUMENTS

| | | | |
|---|---|---|---|
| 5,390,310 A | 2/1995 | Welland | |
| 5,491,793 A * | 2/1996 | Somasundaram et al. | 714/45 |
| 5,574,786 A | 11/1996 | Dayan et al. | |
| 5,809,293 A * | 9/1998 | Bridges et al. | 712/227 |
| 6,173,386 B1 * | 1/2001 | Key et al. | 712/10 |
| 6,249,881 B1 * | 6/2001 | Porten et al. | 714/38.13 |
| 6,282,657 B1 * | 8/2001 | Kaplan et al. | 726/1 |
| 6,604,123 B1 | 8/2003 | Bruno et al. | |
| 7,849,296 B2 | 12/2010 | Watt et al. | |
| 2001/0049763 A1 | 12/2001 | Barry et al. | |
| 2002/0188831 A1 | 12/2002 | Jackson et al. | |
| 2003/0101322 A1 * | 5/2003 | Gardner | 711/163 |
| 2003/0135787 A1 | 7/2003 | DeWitt, Jr. et al. | |
| 2007/0180322 A1 | 8/2007 | Todoroki et al. | |
| 2008/0034193 A1 | 2/2008 | Day et al. | |
| 2008/0082802 A1 | 4/2008 | Muramatsu et al. | |

FOREIGN PATENT DOCUMENTS

EP          1 054 322          11/2000

(Continued)

OTHER PUBLICATIONS

Aerospace Computer Security applications Conference, Dec. 1988, Clifton and Fernandez, pp. 194-198, "A Microprocessor design for multilevel security".
Trusted Computing Group (TCG), Main Specification Version 1.1a, Sep. 1, 2001, pp. i-x and 1-322.

(Continued)

*Primary Examiner* — Kamini Patel
(74) *Attorney, Agent, or Firm* — Nixon & Vanderhye P.C.

(57) ABSTRACT

A data processing apparatus for performing data processing operations in response to execution of program instructions and debug circuitry for performing operations. The data processing apparatus includes a data store for storing a current debug exception mask value. The data processing circuitry is configured to set the mask value to a first value in the data store in response to executing critical code and on termination of execution of the critical code to reset the mask value to not store the first value. The data processing circuitry is configured, in response to receipt of a control signal indicating a debug exception is to be taken, to allow the exception to be taken if the mask value is not set to the first value and not to allow said exception to be taken if the mask value is set to the first value.

23 Claims, 7 Drawing Sheets

(56) References Cited

FOREIGN PATENT DOCUMENTS

| | | |
|---|---|---|
| EP | 1 162 536 | 12/2001 |
| GB | 2 380 831 | 4/2003 |
| JP | 0 581 479 | 12/1998 |
| JP | 2000-76087 | 3/2000 |
| JP | 2000-347942 | 12/2000 |
| JP | 2001-230770 | 8/2001 |
| JP | 2002-526822 | 8/2002 |
| JP | 2002-318700 | 10/2002 |
| JP | 2004-515180 | 5/2004 |
| WO | WO 99/38073 | 7/1999 |
| WO | WO 02/44875 | 6/2002 |
| WO | WO 03/010638 | 2/2003 |

OTHER PUBLICATIONS

English translation of Office Action dated Jul. 8, 2008 in Japanese Application No. 2003-386042.
List of Cited References and documents issued by the Japanese Patent Office mailed Nov. 7, 2008 in Japanese application 2003-386042.
UK Search Report dated May 27, 2011 in GB 1101490.9.
International Search Report and Written Opinion of the International Searching Authority mailed Apr. 2, 2012 in PCT/GB2012/050115.
Written Opinion of the International Preliminary Examining Authority mailed Jan. 21, 2013 in PCT/GB2012/050115.
International Preliminary Report on Patentability mailed Apr. 22, 2013 in PCT/GB2012/050115.

* cited by examiner

CONTROLLING GENERATION OF DEBUG EXCEPTIONS

BACKGROUND OF THE INVENTION

This application claims priority to UK Application No. 1101490.9, filed 28 Jan. 2011, the entire contents of which is hereby incorporated by reference.

FIELD OF THE INVENTION

The field of the invention relates to data processing apparatus and in particular to performing diagnostic operations on data processing apparatus.

DESCRIPTION OF THE PRIOR ART

It is known to provide data processing systems with diagnostic mechanisms which can be used to perform diagnostic operations (e.g. software and hardware fault identification and analysis (debug)) upon the data processing systems so as to assist in the development of hardware, operating systems, application programs, overall system designs and the like.

When analysing a data processing system, an external debugger may be used which comprises a debug program run on a host system that is connected to the system to be analysed such that control signals specifying diagnostic operations to be performed on the system are passed from the host to the system.

External debuggers involve a debugger being connected to the target via an external port which is then used to program the debug hardware, The processor is configured such that debug events cause entry to a special debug state in which the data processing apparatus is interrogated and controlled by the external debugger. The conversion of debug events into debug state entry is controlled by a hardware authentication interface but this does not gate the debugger's ability to program the debug hardware.

Alternatively there may be a self-hosted debug system where debug monitor software is executed on the target being debugged. The debug hardware on the processor is programmed to generate debug events and the processor is configured such that debug events are converted into debug exceptions handled by the software. Often the debug software runs as an unprivileged or low hierarchy task (usually when debugging other unprivileged applications) using services of a privileged or higher hierarchy software executive or kernel to program the debug hardware and be kept informed of debug events. In other scenarios the kernel is itself debugged.

Generally the two schemes share most of the debug hardware such as breakpoint and watchpoint registers.

There are at least three routes for the debug hardware to be programmed:
 1) By a debug monitor in the—for kernel mode debugging;
 2) By a kernel on behalf of an unprivileged debugger task, for application debugging,
 3) By an external debugger via a dedicated debug port.

One problem with debugging is that the programming of breakpoint registers by the debug agent, which is perhaps an external agent, can generate exceptions in the code which may include the operating system code. This has risks associated with it and can cause software malfunction.

It would be desirable to be able to allow debug of a system including an operating system while reducing the risk of the generation of exceptions within the code that might cause the system to malfunction.

SUMMARY OF THE INVENTION

A first aspect of the present invention provides a data processing apparatus comprising: data processing circuitry for performing data processing operations in response to execution of program instructions; debug circuitry for performing operations; said data processing apparatus comprising a data store for storing a debug exception mask value; said data processing circuitry being configured to set said debug exception mask value to a first value in said data store in response to executing critical code and on termination of execution of said critical code to reset said debug exception mask value not to store said first value; wherein said data processing apparatus is configured to allow a debug exception to be taken if said debug exception mask value is not set to said, first value and not to allow said debug exception to be taken if said debug exception mask value is set to said first value, The present invention recognises that the execution of some code is critical to the performance and correct behaviour of the system, such that interrupting the code will almost certainly cause the system to malfunction. It also recognises that although asynchronous interrupts may occur at any point during processing, these generally occur independently of instructions in a currently executing instruction stream and can be allowed to remain pending for a while, the system being configured to take these exceptions when a suitable point in the processing is reached. Synchronous exceptions occur in response to an instruction within the instruction stream and thus, are conventionally taken immediately.

This can cause problems if synchronous exceptions occur during the execution of critical code. Generally a data processing system will guard against such an eventuality by ensuring that during critical code no memory region is accessed that might generate a synchronous exception such as a data abort. However, the present invention recognises that there are other synchronous exceptions that can be generated by debug circuitry and that these are outside the control of the normal processing operations and arrive as unexpected exceptions. It is important that these are not taken and thus, the present invention provides a system wherein in response to executing critical code the processor sets a mask value which is then used to inhibit the taking of any debug exceptions that are received while this critical code is executing. At the end of executing the critical code the mask value is reset so that it no longer holds the value that inhibited the taking of the exceptions. Thus, in this simple yet elegant fashion critical code is protected from exceptions generated synchronously during debug.

In some embodiments the debug circuitry sends a signal to the data processing circuitry indicating a debug exception is to be taken and the processing circuitry inhibits or allows the taking of the exception in dependence upon the current debug mask value. In other embodiments it is the debug circuitry itself that responds to the current mask value by not asserting the control signal to send to the processing circuitry if the debug mask value is set.

Although the debug operations that are performed may be controlled by debug software executing on an external host, in some embodiments said debug circuitry performs said debug operations controlled by software executing on said data processing circuitry.

Critical code may be a number of things, but in some embodiments it comprises a plurality of instructions interruption of which may generate a software malfunction.

The data processing apparatus may be configured to inhibit the taking of exceptions received from debug circuitry when executing different sorts of codes, but it is advantageous if it inhibits it during execution of code where taking of an exception may generate a software malfunction. Clearly it is important when executing such a code that taking of exceptions is inhibited.

This code may comprise a number of things for example it may be code used to save or restore register values configuring the system, it may comprise code acknowledging, disabling or re-enabling interrupt system registers, or it may comprise code for storing a state of a processor to a data store or code for restoring the state from the data store. Clearly, it is important that the state of the processor is correctly stored and correctly restored and thus, interruption of such code is best avoided.

In some embodiments, said data processing circuitry is configured to execute the program instructions corresponding to a plurality of different software hierarchical levels, a higher software hierarchical level being a level with greater privileges than a lower software hierarchical level such that there are at least some data storage locations that can be accessed from said higher hierarchical level that cannot be to accessed from said lower hierarchical level; said current debug exception mask value indicating whether taking of a debug exception at a same hierarchical level as a level software is currently operating at is allowable.

Many processing apparatus process data at different software hierarchical levels, access to certain memory regions and system registers being inhibited from lower hierarchical levels and allowed from higher ones. A debug exception mask value may be used to inhibit debug exceptions being taken at a same hierarchical level as software is currently operating at, these exceptions are often called re-entrant exceptions. Thus, when processing instructions at a certain hierarchical level if the control signal indicates that the debug software is to be executed at that same hierarchical level then the debug exception mask value can be used to avoid the exception being taken and this can be used to inhibit the taking of exceptions when critical code is currently being executed at that level. If critical code is being executed it is important that an exception is not taken at that level as registers storing values vital for the correct behaviour of the processor may be overwritten. If however the control signal indicates that the exception is to be taken at a different hierarchical level (in many embodiments exceptions are only allowed to be taken at a higher hierarchical level) to the currently executing code, then as this other hierarchical level will have its own interrupt registers interruption of the critical code at the lower hierarchical level can be allowed, as no registers storing important information will be overwritten. In this way, embodiments of the present invention provide granularity to the system and only inhibit the taking of exceptions at hierarchical levels where the taking of the exceptions may cause a software malfunction.

In some embodiments, said data processing apparatus comprising a data store configured to store a plurality of debug exception mask values corresponding to said plurality of different software hierarchical levels; said data processing circuitry being configured when switching to one of said plurality of hierarchical software levels to set said current debug exception mask value to a value of said debug exception mask value stored for said one of said hierarchical software level.

In some embodiments the processing apparatus may have storage for storing debug exception mask values for different software hierarchical levels, these values being used to set a current value of said debug exception mask value when switching to execution of program instructions at that level. Storing different mask values for different hierarchical levels provides a high degree of granularity and control.

In some embodiments, said data processing apparatus comprises a status storage region for storing said current debug exception mask value, said data processing circuitry being responsive to switching from one hierarchical software level to a different software hierarchical level to store a value of said debug exception mask value in said status storage region for said one hierarchical level and when switching back to said one hierarchical level to restore said debug exception mask value.

Alternatively rather than storing different mask values for the different hierarchical levels, the value of a debug exception mask may be stored in a status storage regions when leaving a hierarchical level and then this value may be restored to the debug exception mask storage position on return to the level, so that if a debug exception was masked at a level then when returning to that level it is masked again.

In some embodiments said data processing apparatus comprises a status storage region for storing status indicators, at least one of said status indicators comprising a debug allowable status indicator corresponding to at least one of said software hierarchical levels; said data processing circuitry being configured when executing instructions at a predetermined software hierarchical level and said debug software is to be executed on said processing circuitry at said predetermined hierarchical level to allow said exception to be taken if said debug allowable status indicator for said predetermined software hierarchical level is set to a predetermined allowable value and said current debug exception mask value is not set to said first value and not to allow said exception to be taken if either said status indicator is not set to said predetermined allowable value or said current debug exception mask value is set to said first value.

The present technique also recognises that the debugging of systems at different hierarchical levels can lead to exceptions being triggered within higher hierarchical levels where perhaps important code such as operating system code may be being executed and interruption of this code may not be desirable. For example, if a system has been set up such that an operating system running on the processor can be debugged, it may be desirable at some point to be able to inhibit this from happening so that during normal operation the generation of exceptions into the operating system are not allowed, Such generation of exceptions can cause malfunction of the operating system and can provide security problems. Therefore, embodiments of the present invention provide a status indicator that can be set to allow or not allow debugging at certain hierarchical levels. In this way, when the system is being tested for example debugging of all hierarchical levels may be allowed but when the system is shipped debugging of the higher hierarchical levels may be inhibited by setting this status indicator. This means that any application run on the system can be debugged but the operating system which has been thoroughly tested before shipping is not allowed to have debug exceptions generated within it.

This is advantageous particularly where there is an external means for setting breakpoint registers for example. In such a case, an external agent could generate exceptions within an operating system, and such exceptions would not be under the control of the processing system and could cause serious errors and therefore are best avoided.

In some embodiments, said data processing circuitry is configured in response to receipt of said control signal from said debug circuitry indicating said debug exception is to be taken when executing instructions at a predetermined software hierarchical level and said debug software is to be executed at a higher predetermined software hierarchical level to allow said exception to be taken.

Where a debug exception is taken that indicates the debug software is to be executed at a higher predetermined software hierarchical level than the level currently executing instructions then this exception is always allowed to be taken as this higher level has its own registers for storing interrupt values and thus, even were it to interrupt critical code at the lower level it would not cause the state of the processor to be corrupted.

In some embodiments, said data processing circuitry is configured when switching from a lower to a higher software hierarchical level in response to an exception to set said current debug exception mask value to said first value.

On taking an exception critical code is executed and thus, it is desirable if the processing apparatus sets the mask value such that the critical code cannot be interrupted by the taking of a further debug exception at this level.

Debug exceptions can take a number of forms but there may be a watchpoint which is an address stored in a register, wherein access or an attempt to access to this address triggers assertion of a debug control signal or it could be a breakpoint which is also an address stored in a debug register, wherein executing or attempting to execute an instruction having this address causes the debug control signal to be asserted.

In some embodiments, said data processing circuitry is configured in response to receipt of a control signal from said debug circuitry indicating a debug exception is to be taken and said debug exception mask value being set to said first value, to assert a pending debug exception signal and in response to said mask being cleared to not store said first value to take said pending debug exception.

As noted previously, debug exceptions are synchronous exceptions in that they occur in response to execution of instructions, In the case that the mask value is set to a first value indicating that the exception cannot be triggered then in some embodiments a pending debug exception signal is generated and when the mask has cleared and no longer stores the first value then the pending debug exception can be taken provided that the debug allowable status indicator indicates that it is allowable This is desirable as the debug exception indicates that a person debugging the program wants to know the status of the processor. Thus, although an immediate response is inhibited as this might cause software malfunction a later response is allowed and may generate useful information.

In some embodiments, said data processing circuitry is configured in response to a step mode control signal to execute in a step mode wherein instructions within a program are executed as sequential steps, wherein in said step mode said data processing circuitry is configured after execution of each of said sequential instructions to assert a debug exception.

One possible debug mode that embodiments of the present invention, support is the step mode wherein each instruction is executed and then a debug exception is taken. In this way, the program is stepped through and after execution of each instruction control is given to debug software such that the values in registers or other state of the processor can be queried.

In some embodiments, in response to said data processing circuitry receiving an exception during execution of one of said sequential instructions, said data processing apparatus is configured to set said current debug exception mask value to said first value and assert upending debug exception and in response to said current debug exception mask value not being set to said first value said data processing circuitry is configured to take said pending debug exception.

If an exception occurs during execution of the sequential instructions in a stepwise mode then the use of the pending debug exception and the debug exception mask can help ensure that the debug exception is not taken during execution of the critical code in the exception but the debug exception is taken when the mask has been cleared, which occurs when the critical code is complete.

In some embodiments, said data processing circuitry is configured to set a plurality of masks for masking different types of exceptions when switching from a lower to a higher software hierarchical level in response to an exception and to reset all of said masks in response to execution of a single instruction.

In addition to the mask masking out the debug exception, there may be other masks set to mask the taking of other asynchronous, exceptions during the execution of critical code. If this is the case, then if termination of the critical code is indicated by a single instruction then execution of this instruction could trigger clearing of all of the masks. In this way, the clearing of the debug mask does not require any additional code as it can be cleared along with the other masks.

In some embodiments said single instruction comprises an instruction indicating execution of critical code has finished.

It should be noted that any subset of the masks could be cleared or indeed set in one instruction. Although the different hierarchical levels of the processing apparatus can be a number of things, in some embodiments there is a first low level which is a level where application software is executed, a second higher level where operating systems software is executed and a third highest level where hypervisor software is executed, In some embodiments, said data processing apparatus comprises a status storage region for storing indicators, comprising a status indicator and a further trap indicator, said trap indicator having a trap value indicating said debug software is to be executed at said hypervisor level; said data processing circuitry being configured in response to said trap indicator having said trap value, not to allow a debug exception to be taken if said processing circuitry is currently operating at said hypervisor level and either said status indicator is not set to said predetermined allowable value or said current debug exception mask value is set to said first value, and to allow a debug exception to be taken at said hypervisor level if both said status indicator is set to said predetermined allowable value and said current debug exception mask value is not set to said first value, or said data processing circuitry is currently operating a level hierarchically lower than said hypervisor level.

One way of providing granularity is to have a single status indicator that allows or does not allow re-entrant debug exceptions to occur at the current hierarchical level and a further trap indicator that traps exceptions into the hypervisor level provided the current level is hierarchically below hypervisor level. In many cases such as in the embodiment shown in FIG. 1 there is no level above hypervisor level, however, if there is such a level and the processing circuitry is operating at that level then the trap value will not trap the exception into the hypervisor level as exceptions cannot be taken at lower hierarchical levels. As noted previously exceptions can always be taken at a higher level, so if the exception occurs at a level that is below the hypervisor level then it can be taken. If the processing circuitry is operating at the hypervisor level then provided that the status indicator allows the exception to be taken and it is not masked then it will taken.

A second aspect of the present invention provides a method for controlling initiation of debug operations within a data processing apparatus, said method comprising the steps of: setting a current debug exception mask value to a first value in a data store within said data processing apparatus in response to said data processing apparatus executing critical code and on termination of execution of said critical code resetting said current debug exception mask value not to store said first value; allowing a debug exception to be taken if said current debug exception mask value is not set to said first value and not allowing said debug exception to be taken if said current debug exception mask value is set to said first value.

A third aspect of the present invention provides a computer program product storing a computer program, which is operable when executed on a data processor to control the data processor to perform the steps of the method according to a second aspect of the present invention.

A fourth aspect of the present invention provides a virtual machine provided by a computer program executing upon a data processing apparatus, said virtual machine providing an instruction execution environment according to the data processing apparatus of the first aspect of the present invention.

A fifth aspect of the present invention provides means for processing data comprising: processing means for performing data processing operations in response to execution of program instructions; debug means for performing operations controlled by debug software; said means for processing data comprising a storage means for storing a debug exception mask value; said data processing means being for setting said debug exception mask value to a first value in said storage means in response to executing critical code and on termination of execution of said critical code for resetting said debug exception mask value not to store said first value; wherein said processing means is configured to allow a debug exception to be taken if said debug exception mask value is not set to said first value and not to allow said debug exception to be taken if said debug exception mask value is set to said first value.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
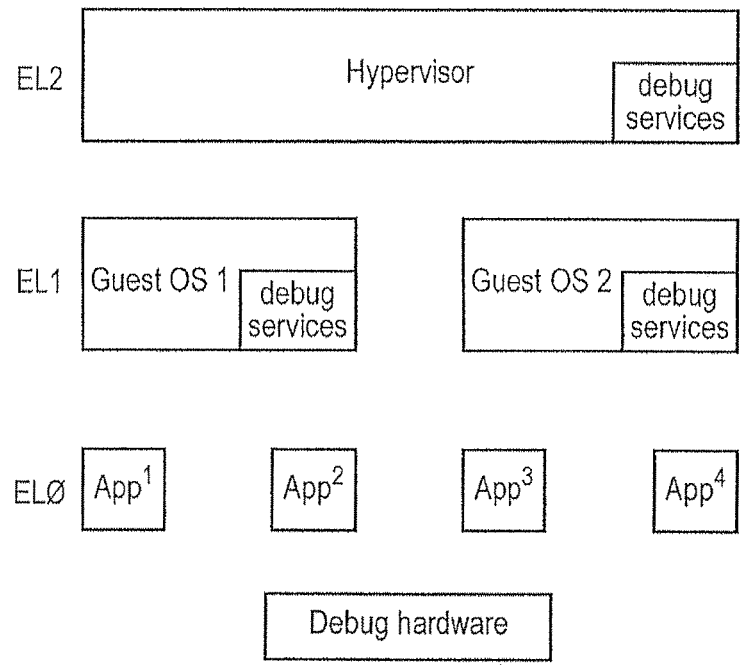
FIG. 1 shows the hierarchical software levels of a data processing apparatus according to an embodiment of the present invention.

FIG. 1 schematically illustrates the different hierarchical software levels of a data processing apparatus according to an embodiment of the present invention. In this embodiment there is a highest hierarchical level EL2, that comprises the hypervisor. This may have some debug services within it, where the debugger can run as a hypervisor application, and the hypervisor is responsible for programming the debug hardware.

The next level is the EL1 level where guest operating systems are executed. These levels may also have debug services within them. Once again these debug services are responsible for programming the debug hardware.

The third level is the lowest EL0 level which is the level at which applications are executed. One of these applications may be a debug application.

Figure 2:
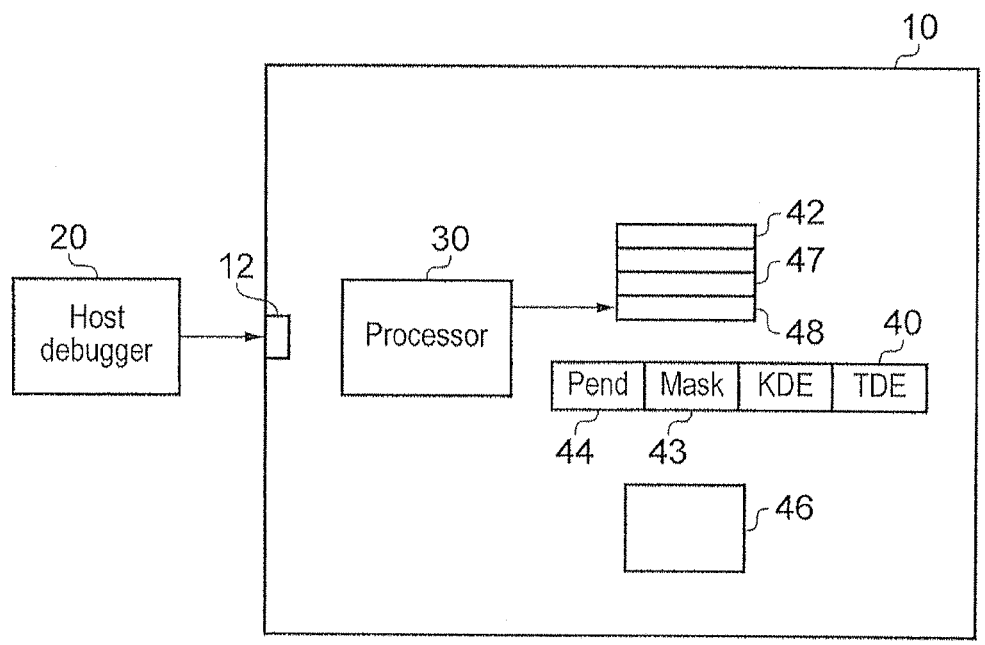
FIG. 2 shows a data processing apparatus connected to a host debugger.

FIG. 2 shows a data processing apparatus according to an embodiment of the present invention. Data processing apparatus 10 in this embodiment is connected to a host debugger 20. The host debugger communicates with data processing apparatus 10 via an input 12 and transmits debug instructions to the data processing apparatus 10 and receives diagnostic data from it. Data processing apparatus 10 comprises a processor 30 for executing a stream of instructions. It also comprises debug hardware 40, 47, 48 which includes data storage 40 for storing status indicators and mask values indicating whether or not a debug exception can be taken and registers 47, 48 within register bank 42 for storing breakpoint and watchpoint values indicating places where a debug exception should be taken.

With regard to the mask values there may be several mask values stored each one pertaining to a particular hierarchical level and acting to mask debug exceptions that are to be taken at that level. One of these will be the current debug mask value or mask flag, which when set inhibits debug exceptions that are re-entrant exceptions that are to be taken at the current software hierarchical level. This mask flag is part of the state of the processor and thus, when storing state in response to an interrupt this value is also stored. The operation of the mask values is described later.

There is also at least one store 46 for storing this state of a processor, when an interrupt or other exception is taken. As noted previously the state of the processor stored in data store 46 may include the current debug mask value or mask flag if the processor is changing software hierarchical level.

There may be several stores 46, one for each software hierarchical level. When an interrupt is taken at say EL1, the current state of the processor will be saved to a store 46 for the EL1 level, when switching back to the interrupted processing at EL1 the state is restored from the store 46 for EL1. If the debug mask was set for EL1, then this value will have been stored in the store and will be set again when the state is restored.

The stores 46 may be dedicated solely for the purpose of storing the state of a processor when exceptions are taken, or may be part of a more general purpose store, such as a data memory.

The host debugger 20 may program the debug hardware 40, 47, 48 itself and execute the debugging software on a separate processor within host debugger 20. Alternatively, the processor 30 may have debug services within one of its software hierarchical levels and in response to signals from the host debugger these may be used to program the debug hardware, Furthermore, the host debugger 20 may itself be a program executing on processor 30.

The breakpoint and watchpoint values are set in the registers 47 and 48. In response to an address in the breakpoint registers appearing as the address of an instruction that is being executed or in response to an address in the watchpoint registers appearing as the address of a data location being accessed, a debug exception is generated. This exception causes the debug software to take control of the processor and communicate with the user in order to relay to the debugger information about the state of the processor at this point.

As noted previously, there are circumstances where the taking of an exception when code is being executed is not desirable and thus, embodiments of the present invention provide mechanisms for inhibiting the taking of these debug exceptions where it is inappropriate to do so. This sort of granularity of control can be done in different ways. For example, the taking of exceptions when an operating system is executing may not be desirable, however it may be desirable to be able to debug that operating system prior to shipping it, Thus, it may be advantageous to provide a kernel debugger within a operating system at the EL1 level but to be able to inhibit the taking of any exceptions generated by this debugger with the use of an inhibit flag: the KDE bit.

Thus, if the KDE bit stored in data store 40 is clear then any breakpoints or watchpoints are disabled such that no exceptions are generated if these addresses are accessed from the EL1 level unless the TDE bit is set, which will be described later. In this way, the ability to debug the operating system is provided along with the ability to disable this debugging such that where appropriate exceptions cannot be generated into the kernel. Thus, the system can be debugged thoroughly prior to shipping but after shipping the KDE bit could, for example, be permanently cleared such that no debugging of the kernel is allowed.

There is also a TDE bit stored in data store 40 and this bit traps any exceptions generated by a breakpoint or watchpoint match into the hypervisor at the EL2 level so that any exceptions generated are taken and serviced within the hypervisor. Although, in this example data store 40 is shown as a different store to registers 42 these flags may be stored within registers within register bank 42.

It should be noted that although the KDE bit is described above with respect to the EL1 level, there may also be a separate KDE bit for the EL2 level that inhibits the taking of debug exceptions at this level.

Alternatively, in some embodiments there is a single KDE bit which relates to the EL1 level if the TDE bit is not set. If the TDE bit is set, debug exceptions are trapped into hypervisor level and in some embodiments the TDE bit is used when set to indicate that the KDE bit relates to the EL2 level. As the TDE bit being set traps any debug exception into the hypervisor level, if the exception occurs at the EL1 level the exception can always be taken as it is being taken at a higher hierarchical level, thus it is convenient to use a single KDE bit for both the EL1 level (when TDE is not set) and the EL2 level when TDE is set.

In this way the TDE and KDE bits together can inhibit or allow the taking of re-entrant exceptions at the EL1 and the EL2 levels.

In addition to the ability to provide granularity in whether or not kernel debug is allowed, there may also be the ability to inhibit the taking of debugging exceptions when particular code is executed. This is provided by the current debug mask value or mask flag 43. The mask flag is set by processor 30 when executing a particular code. Thus, if the processor is executing code at the EL1 level and that code is critical code interruption of which might cause a software malfunction then the processor 30 sets the debug mask flag. Then if a debug exception is generated it cannot be taken at this level as this mask flag inhibits it from being taken.

In some embodiments, this may mean that the exception is never taken, while in other embodiments a pending flag 44 might be set. If this is the case, when the mask flag is reset after the processor has finished executing the critical code, perhaps by a software instruction, the pending exception can be taken.

Figure 3A:
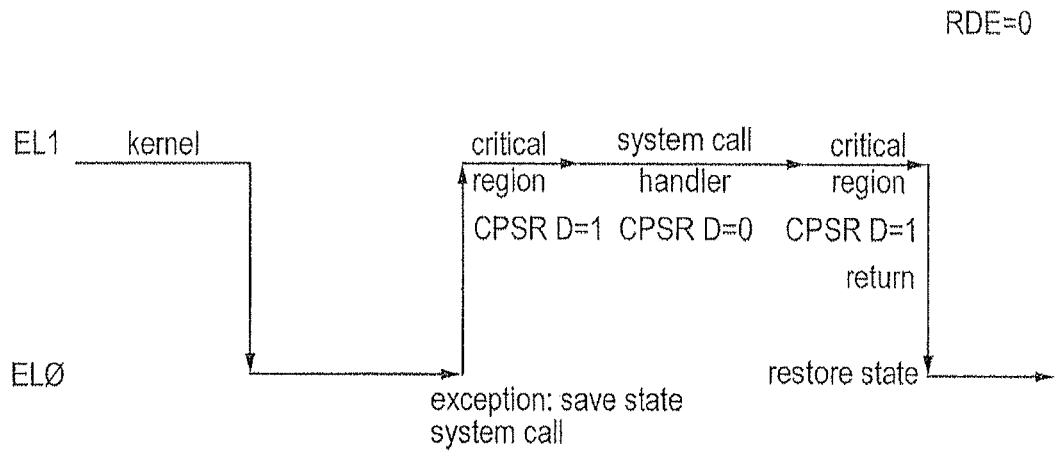
FIG. 3a shows the taking of an exception at the EL1 level from the EL0 level with KDE set to 0.
Figure 3B:
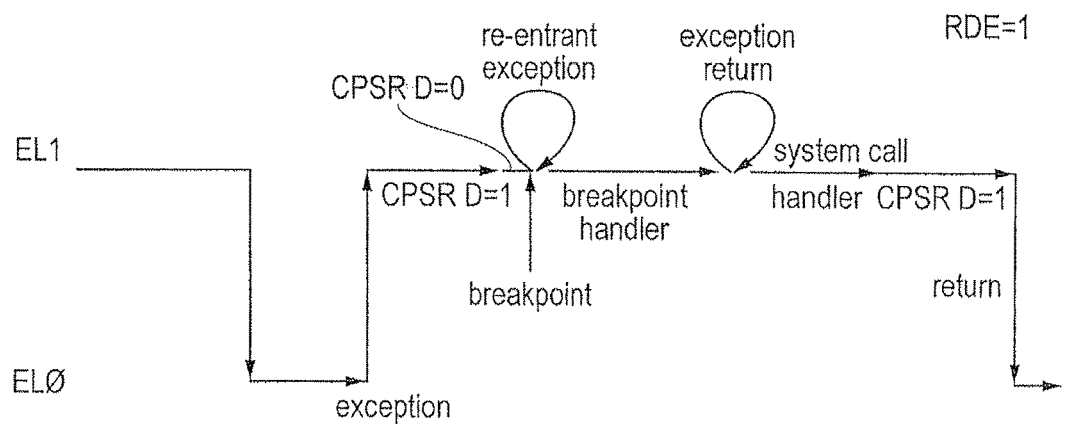
FIG. 3b shows the taking of an exception at the EL1 level from the EL0 level with KDE set to 1 and the taking of a re-entrant exception in response to a debug event.
Figure 4:
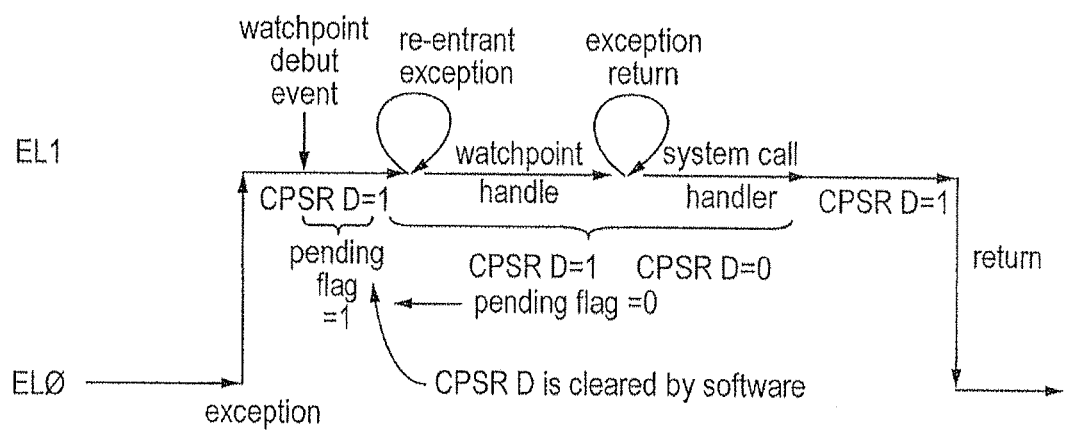
FIG. 4 shows the taking of an exception at the EL1 level from the EL0 level with KDE set to 1 and the taking of a re-entrant exception in response to a debug event occurring during when a debug mask is set.

This is shown in more detail with respect to FIGS. 3a, 3b and 4. In these figures an application is running at the application EL0 level and an exception is received (this exception may be any type of exception not just a debug exception). The processor then moves to the EL1 level to process the exception. Initially when starting execution at this level, critical code is executed which saves the state of the processor such that on return to the application this state can be restored. It is important that during execution of this critical code no further exception is taken at this level as this would overwrite this state that is being saved. Thus, at this point the debug mask flag CPSR.D is set to 1. The system exception handler is then executed and this processes the exception. At some point during this processing, the system exception handler may have completed saving the state of the processor, meaning that software can leave this critical code region and the CPSR.D flag is set to 0. When the system exception handler has completed its processing of the exception, it determines that it must return to processing the interrupted application and thus a further critical code region is entered and the debug mask flag CPSR.D is set to 1 again while the state of the processor at the point of the original exception is restored.

In FIG. 3a the KDE hit is set to 0 and thus, no debug exceptions are allowed to be taken at the EL1 level and all breakpoints and watchpoints are disabled. Thus, no debug exceptions are received during the processing at EL1, in neither the critical region nor the rest of the system exception handler.

In FIG. 3b the KDE bit is set to 1, and thus debug exceptions are allowed to be taken at the EL1 level, but not inside the critical code regions. Such a re-entrant debug exception is received, in response to a breakpoint and as at this point the debug mask flag CPSR.D is 0 and KDE=1, this debug exception is taken and the kernel processes the exception using a breakpoint handler. When this is complete there is an exception return and the kernel continues processing the system exception handler. When the system exception processing has completed then the critical region of code is entered where the debug mask flag is set to 1 and if any debug exception is received at this point it is ignored.

FIG. 4 shows a further example of handling exceptions according to an embodiment of the present invention. Once again as in FIG. 3b the KDE bit is set, and an exception is received at the application level and is taken and processing switches to the EL1 level. Critical code is initially executed for saving the state of the processor and thus the debug mask flag CPSR.D is set to 1. During this time a watchpoint debug event occurs and as the debug mask flag is set this cannot be taken, however, because KDE is set rather than ignoring this watchpoint in this embodiment a pending debug exception flag is set to 1. Thus, when the critical code has finished executing and the software has reset the debug mask flag to 0 the pending debug exception flag indicates to the processor that there is a pending debug exception and this is therefore taken at this point and the kernel executes the watchpoint handler to handle the exception.

Immediately the pending debug exception is taken the processor saves the current value of the pending debug mask flag which is 0 and then sets it (CPSR.D) to 1. The debug exception handler in this case the watchpoint handler is then executed and when it has completed the stored value for the debug mask flag is restored in this case CPSR.D is reset to 0. At this point the system call handler executes and when this has completed the software enters the exception return code, which is critical code and thus, the debug exception flag CPSR.D is once again set to 1 for the duration of the execution of this code.

Although, in the previous examples the KDE bit has been described with respect to the EL1 level, there may also be a KDE bit relevant for the EL2 level. If the KDE bit is clear for a particular level then software debug events are disabled within that level. In some embodiments, there will be some debug events that are enabled even if the KDE bit is clear for that level. For example software breakpoint instructions are a type of instruction that generates a debug exception: a debugger replaces an actual program instruction with a software breakpoint instruction as a means to set a breakpoint at a location when no hardware breakpoint register 42 is available. Since the original program instruction is no longer present, it would be unsafe to ignore such debug exceptions, even when the KDE bit is clear, When the TDE bit is set then software debug events from either the EL0 or the EL1 levels are trapped to the EL2 level. Thus, if the TOE bit is set any debug event occurring in EL0 or EL1 will not be affected by the KDE bit for the EL1 level and will be taken at the EL2 level.

In some embodiments there is a single KDE bit which affects debug exceptions at the EL1 level when the TDE hit is clear, and affects debug exceptions at the EL2 level when the TDE bit is set.

In some embodiments, the debugger is configured to execute a simple software step state machine wherein after each instruction is executed the processor is stopped and the state analysed. As software step is under software control, stepping is also controlled by the global debug enable controls such that the software step to debugger is either enabled or disabled at the current exception level.

Figure 5:
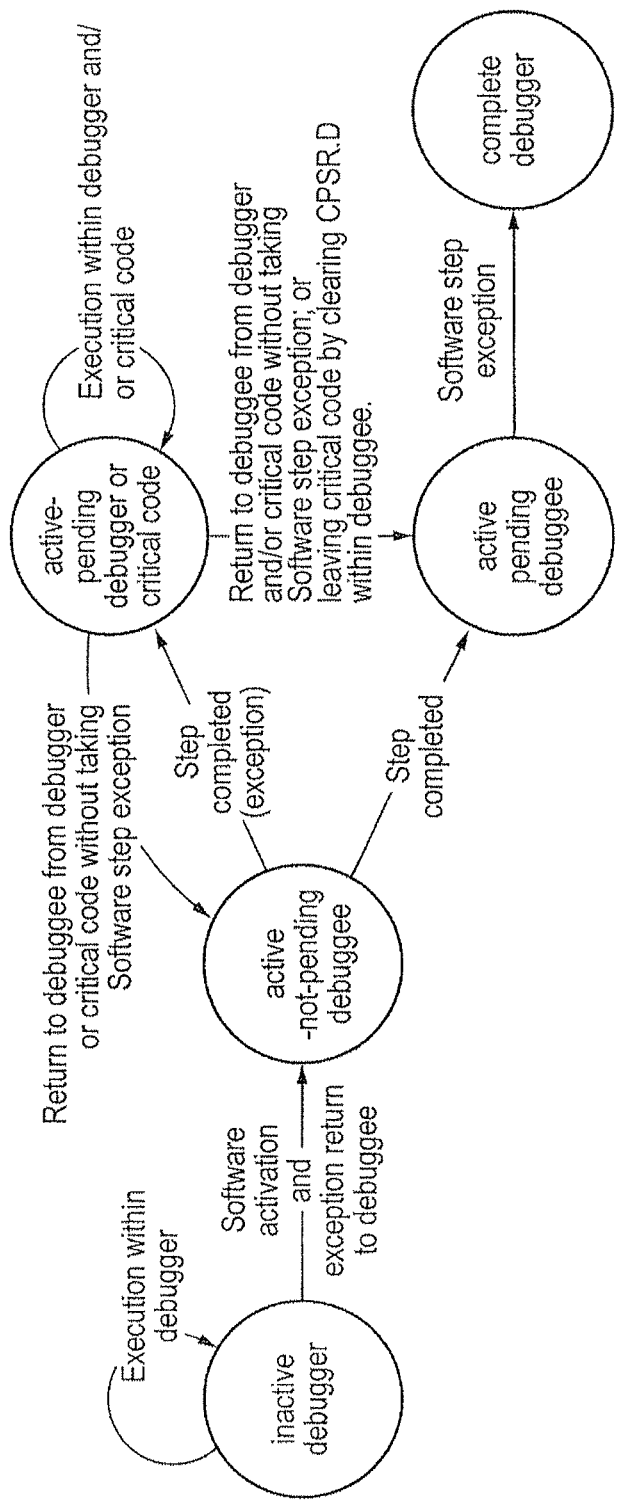
FIG. 5 shows a state diagram indicating the states encountered during software step debug operation.

FIG. 5 shows a state diagram indicating the states encountered during an example software step debug operation. In this diagram, there are three types of code: the "debugger" comprises the debugger code itself, for example, code that executes at EL1; the "debuggee" comprises the code being debugged, for example, code that executes at EL0 and, if KDE is set, code executing at EL1 other than critical code; and "critical code" comprises code that must not be interrupted by a debug exception, that is, code executed at the same level as the debugger (EL1) with the debug mask flag CPSR.D set.

Before starting the step process the software step state machine is in the inactive state and the debugger code is running. The debugger sets the process up for stepping by setting the single-step control flag in the monitor debug status and control register (MDSCR_EL1) from the EL1 level. The debugger then executes an exception return instruction to jump into the debuggee code. When in the debuggee code the single-step debug events are active, but the exception is not yet pending.

The processor then executes an instruction which, normally, moves the software step state machine to the active-pending state. At this point the pending software step debug exception is taken and execution returns to the debugger and single-step is complete.

However, if during execution of the instruction another exception is encountered then this is taken and as critical code is run initially, the processor sets the debug mask flag, CPSR.D, meaning the pending single-step debug exception is masked. The debug exception can be taken only when the critical code has completed and the CPSR.D flag is cleared. If the exception handler does not clear the CPSR.D flag, however, and returns to the debuggee code. The pending single-step debug exception will be cleared if the exception handler returns to re-execute the instruction that was being stepped.

The granularity that can be achieved through the debug mask flag and the TDE and KDE bits is shown for some example cases in the following table. This table shows whether a debug event is taken or not from some configurations of these flags. In this embodiment debug exceptions are only taken at the EL1 or EL2 levels.

|     | Level | TDE | KDE | CPSR.D | Action on debug event |
| --- | --- | --- | --- | --- | --- |
| 601 | EL0 | 0 | X | X | Take at EL1 |
| 602 |  | 1 | X | X | Take at EL2 |
| 603 | EL1 | 0 | 0 | X | Ignore |
| 604 |  | 0 | 1 | 1 | Ignore |
| 605 |  | 0 | 1 | 0 | Re-entrant exception to EL1 |
| 606 |  | 1 | X | X | Take at EL2 |
| 607 | EL2 | 0 | X | X | Ignore |
| 608 |  | 1 | 0 | X | Ignore |
| 609 |  | 1 | 1 | 1 | Ignore |
| 610 |  | 1 | 1 | 0 | Re-entrant exception to EL2 |

The first two rows 601, 602 show what occurs when executing at EL0. If the TDE bit is clear (row 601), a debug exception at EL0 is handled at EL1. If the TDE bit is set (row 602), a debug exception at EL0 is handled at EL2. Note that the CPSR.D flag and KDE bit have no effect at EL0. In this table, "X" means "don't care," meaning the action for that row does not depend on the value for that column.

The next four rows 603, 604, 605, 606 show the behaviour when executing at EL1. If both the TDE and KDE bits are clear (row 603) then debug exceptions are ignored. If the KDE bit is set and the TDE bit is clear then debug exceptions are potentially allowed at EL1, depending on the value of the CPSR.D flag. In row 604, the CPSR.D flag is also set. In this case critical code is being executed at the EL1 level. Debug events are currently masked and will be ignored. However, in row 605 the CPSR.D flag is clear so the debug exception is allowed as a re-entrant exception to EL1. In row 606 the TDE bit is set so the KDE hit and CPSR.D flag are ignored and the debug exception is taken at EL2.

The remaining four rows, 607, 608, 609, 610 show the behaviour when executing at EL2. If either the TDE or KDE bits are clear (rows 607, 608), debug exceptions are ignored. If the TDE and KDE bits are both set, however, then debug exceptions are potentially allowed at EL2, depending on the value of the CFSR.D flag. In row 609, the CFSR.D flag is also set. In this case critical code is being executed at the EL2 level. Debug events are currently masked and will be ignored. However, in row 610 the CPSR.D flag is clear so the debug exception is allowed as a re-entrant exception to EL2.

Figure 6:
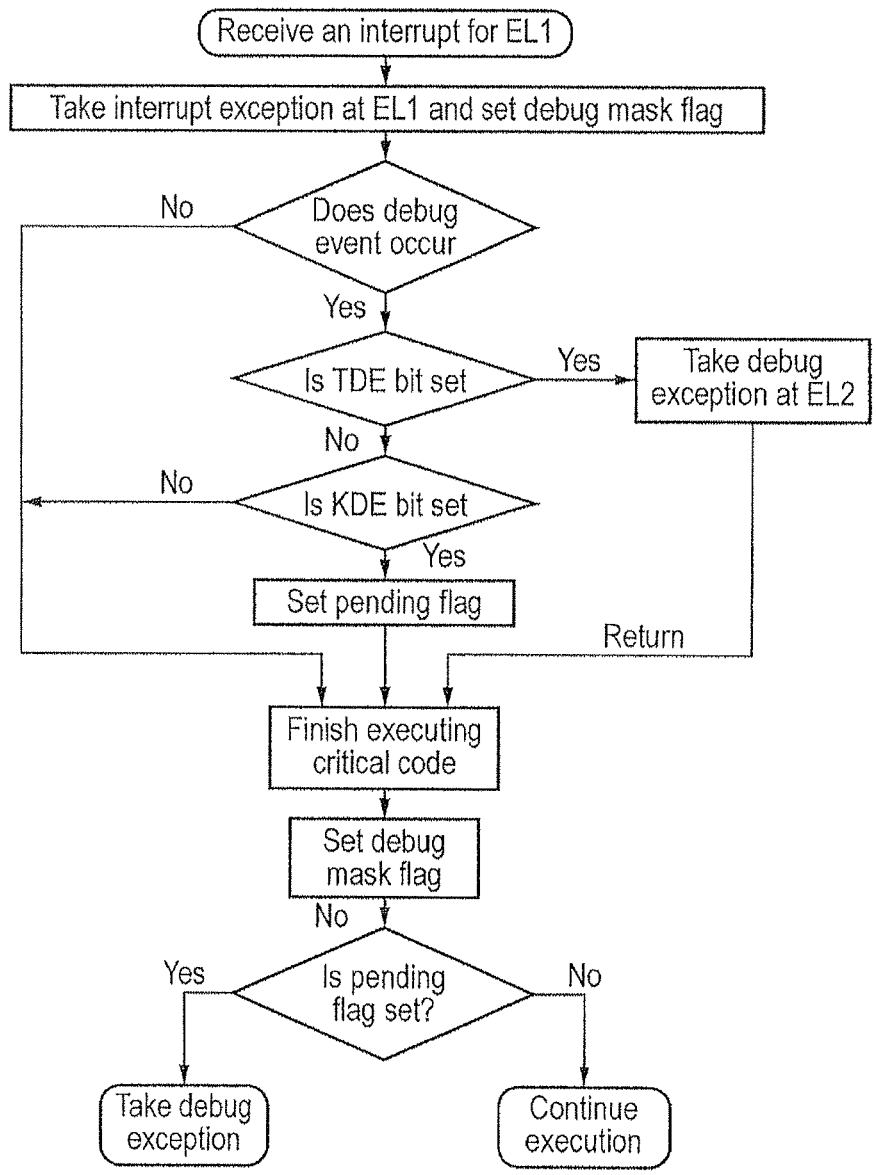
FIG. 6 shows a flow diagram illustrating steps that occur when executing critical code having taken an interrupt.

FIG. 6 shows steps performed in response to receiving an interrupt. If an interrupt is received at the EL0 level, then an interrupt exception is taken at the EL1 level and the debug mask flag is set and the critical code necessary for processing an interrupt exception which relates to storing the current state of the processor is performed. During execution of the critical code the debug mask flag is set so that if a debug event occurs, unless the TDE bit is set or the KDE bit is set, it is ignored. In this embodiment if the TDE bit is not set and the KDE bit is set a pending debug exception flag is set. If the TDE bit is set then the exception is trapped to the EL2 level where it is processed and then on return execution of the critical code is finished, and no pending debug exception flag is set. In other embodiments a pending debug exception flag may be set for particular types of debug exception but not others (which are ignored), or not set at all.

After the critical code has finished executing the debug mask flag is reset and it is determined whether the debug exception pending flag is set or not. If it is set then the pending debug exception is taken; if not execution of the interrupt exception continues.

Figure 7:
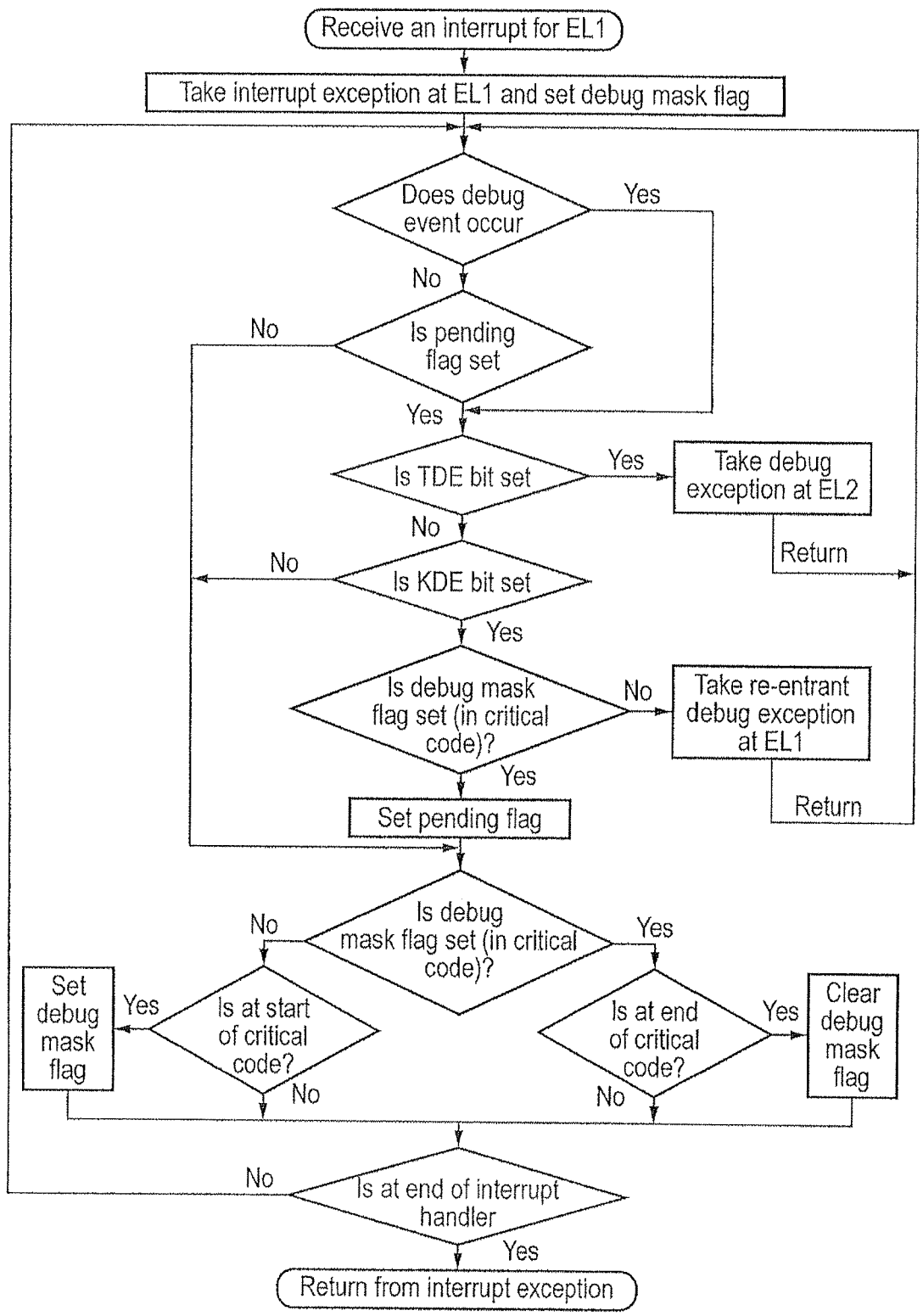
FIG. 7 shows a flow diagram similar to FIG. 6, but where multiple exceptions may occur.

FIG. 7 is a similar flow diagram to that of FIG. 6 but is more complex as it shows additionally what could occur if multiple debug events occurred during execution of the critical code. Thus, again an interrupt for EL1 is received and is taken, the critical code is executed so the debug mask is set. It is then determined whether a debug event occurs or whether the pending flag is set indicating a debug event is pending. If either is true and the TDE bit is set then the exception is taken at EL2. Otherwise if the KDE bit is not set, so that debug is not allowed at the EL1 level then the event is ignored.

If the KDE bit is set indicating debug is allowed then it is determined whether the debug mask is still set (is critical code still executing) if it is then the pending flag is set, if not the re-entrant exception at EL1 is taken. The pending flag is cumulative, meaning that if it was already set then it remains set.

If the exception is not taken then or if no debug event has occurred it is then determined whether the debug mask is still set. If it is not it is determined whether the processor is at the start of processing critical code, if so the debug mask flag is set if not it is not. If the debug mask is still set it is determined whether the processor is at the end of execution of critical code, if so the debug mask flag is cleared if not it is not. It is then determined whether the end of the interrupt handler has been reached. if so a return from the exception back to EL0 is executed, if not it is again determined whether a debug event has occurred and the method steps are repeated.

Figure 8:
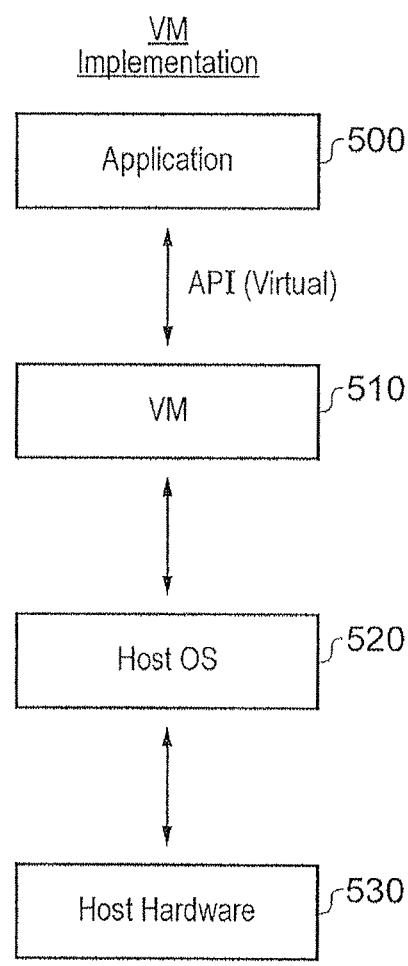
FIG. 8 shows a virtual machine implementation of an embodiment of the present invention.

FIG. 8 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
data processing circuitry for performing data processing operations in response to execution of program instructions;
debug circuitry for performing debug operations;
said data processing apparatus comprising a data store for storing a current debug exception mask value;
said data processing circuitry being configured to set said current debug exception mask value to a first value in said data store in response to executing critical code and on termination of execution of said critical code to reset said current debug exception mask value to not store said first value; wherein said data processing circuitry is configured to allow a debug exception to be taken if said current debug exception mask value is not set to said first value and not to allow said debug exception to be taken if said current debug exception mask value is set to said first value, said data processing circuitry further configured to execute program instructions corresponding to a plurality of different software hierarchical levels, a higher software hierarchical level being a level with greater privileges than a lower software hierarchical level such that there are at least some data storage locations that can be accessed from said higher hierarchical level and cannot be accessed from said lower hierarchical level, and said current debug exception mask value indicating whether taking of a debug exception at a same hierarchical level as a level software is currently operating at is allowable.

2. A data processing apparatus according to claim 1, wherein said debug circuitry performs said debug operations controlled by debug software executing on said data processing circuitry.

3. A data processing apparatus according to claim 1, wherein said critical code comprises a plurality of instructions interruption of which may generate a software malfunction.

4. A data processing apparatus according to claim 2, wherein said critical code comprises code for storing a state of a processor to a data store and code for restoring a state of a processor from state stored in a data store.

5. A data processing apparatus according to claim 1, said data processing apparatus comprising a data store configured to store a plurality of debug exception mask values corresponding to said plurality of different software hierarchical levels;
said data processing circuitry being configured to set said current debug exception mask value when switching to one of said plurality of hierarchical software levels to a value of said debug exception mask value stored for said one of said hierarchical software levels.

6. A data processing apparatus according to claim 1, said data processing apparatus comprising a status storage region for storing said current debug exception mask value, said data processing circuitry being responsive to switching from one hierarchical software level to a different software hierarchical level to store a value of said debug exception mask value in said status storage region for said one hierarchical level and when switching back to said one hierarchical level to restore said debug exception mask value.

7. A data processing apparatus according to claim 1, wherein
said data processing apparatus comprising a status storage region for storing status indicators, at least one of said status indicators comprising a debug allowable status indicator corresponding to at least one of said software hierarchical levels;
said data processing circuitry being configured when executing instructions at a predetermined software hierarchical level where said debug software is to be executed on said processing circuitry at said predetermined hierarchical level to allow said debug exception to be taken if said debug allowable status indicator for said predetermined software hierarchical level is set to a predetermined allowable value and said current debug exception mask value is not set to said first value and not to allow said debug exception to be taken if either said status indicator is not set to said predetermined allowable value or said current debug exception mask value is set to said first value.

8. A data processing apparatus according to claim 4, said data processing circuitry being configured when executing instructions at a predetermined software hierarchical level and said debug software is to be executed at a higher predetermined software hierarchical level to allow said exception to be taken.

9. A data processing apparatus according to claim 1, wherein said data processing circuitry is configured when switching from a lower to a higher software hierarchical level in response to an exception to set said debug exception mask value to said first value.

10. A data processing apparatus according to claim 4, said data processing circuitry being configured to set a plurality of masks for masking different types of exceptions when switching from a lower to a higher software hierarchical level in response to an exception and to reset all of said masks in response to execution of a single instruction.

11. A data processing apparatus according to claim 10, wherein said single instruction comprises an instruction indicating execution of critical code has finished.

12. A data processing apparatus according to claim 4, wherein
said software hierarchical levels comprise a first low level comprising application software, a second higher level comprising operating system software and an extension to said operating system software comprising debug software and a third highest level comprising hypervisor software.

13. A data processing apparatus according to claim 12, said data processing apparatus comprising a status storage region for storing indicators, comprising a status indicator and a further trap indicator, said trap indicator having a trap value indicating said debug software is to be executed at said hypervisor level;
said data processing circuitry being configured in response to said trap indicator having said trap value, not to allow a debug exception to be taken if said processing circuitry is currently operating at said hypervisor level and either said status indicator is not set to said predetermined allowable value or said current debug exception mask value is set to said first value, and to allow a debug exception to be taken at said hypervisor level if both said status indicator is set to said predetermined allowable value and said current debug exception mask value is not set to said first value, or said data processing circuitry is currently operating a level hierarchically lower than said hypervisor level.

14. A data processing apparatus according to claim 1, wherein
said debug exception comprises at least one of a watchpoint or a breakpoint.

15. A data processing apparatus according to claim 1, wherein said data processing circuitry being configured in response to receipt of a a debug exception and to said current debug exception mask value being set to said first value, to assert a pending debug exception signal and in response to said current debug exception mask value being cleared not to store said first value and to take said pending debug exception.

16. A data processing apparatus according to claim 1, wherein
said data processing circuitry is configured in response to a step mode control signal to execute in a step mode wherein instructions within a program are executed as sequential steps, wherein in said step mode said data processing circuitry is configured after execution of each of said sequential instructions to assert a debug exception.

17. A data processing apparatus according to claim 16, wherein in response to said data processing circuitry receiving an exception during execution of one of said sequential instructions, said data processing apparatus is configured to set said current debug exception mask value to said first value and to assert a pending debug exception and in response to said current debug exception mask value not being set to said first value, said data processing circuitry is configured to take said pending debug exception.

18. A method for controlling initiation of debug operations within a data processing apparatus, said method comprising the steps of:
setting a current debug exception mask value to a first value in a data store within said data processing apparatus in response to said data processing apparatus executing critical code and on termination of execution of said critical code resetting said current debug exception mask value not to store said first value;
allowing a debug exception to be taken if said current debug exception mask value is not set to said first value and not allowing said debug exception to be taken if said current debug exception mask value is set to said first value, wherein said data processing circuitry being configured to execute program instructions corresponding to a plurality of different software hierarchical levels, a higher software hierarchical level being a level with greater privileges than a lower software hierarchical level such that there are at least some data storage locations that can be accessed from said higher hierarchical level and cannot be accessed from said lower hierarchical level;
said current debug exception mask value indicating whether taking of a debug exception at a same hierarchical level as a level software is currently operating at is allowable.

19. A method according to claim 18,
said data processing apparatus comprising a status storage region for storing status indicators, at least one of said status indicators comprising a debug allowable status indicator corresponding to at least one of said software hierarchical levels;
when executing instructions at said predetermined software hierarchical level:

allowing said debug exception to be taken if said debug allowable status indicator for said predetermined software hierarchical level is set to a predetermined allowable value and said current debug exception mask value is not set to said first value; and not allowing said debug exception to be taken if either said status indicator is not set to said predetermined allowable value or said current debug exception mask value is set to said first value.

20. A method according to claim 18, when executing instructions at a predetermined software hierarchical level and said debug software is to be executed at a higher predetermined software hierarchical level allowing said debug exception to be taken.

21. A computer program product including a non-transitory computer readable storage medium, said medium storing a computer program which is operable when executed on a data processor to control the data processor to perform the steps of the method according to claim 18.

22. A virtual machine provided by a computer program executing upon a data processing apparatus, said virtual machine providing an instruction execution environment according to the data processing apparatus as claimed in claim 1.

23. A data processor comprising:

processing means for performing data processing operations in response to execution of program instructions;

debug means for performing debug operations;

said processing means comprising a storage means for storing a debug exception mask value;

said processing means for setting said debug exception mask value to a first value in said storage means, in response to executing critical code and on termination of execution of said critical code, for resetting said debug exception mask value not to store said first value; wherein said processing means is configured to allow a debug exception to be taken if said debug exception mask value is not set to said first value and not to allow said debug exception to be taken if said debug exception mask value is set to said first value.

* * * * *